United States Patent

Mukaiyama et al.

[11] Patent Number: 5,926,250
[45] Date of Patent: Jul. 20, 1999

[54] MULTIFOCAL LENS FOR EYEGLASS AND EYEGLASS LENS

[75] Inventors: Hiroyuki Mukaiyama; Kazutoshi Kato; Akira Komatsu; Tadashi Kaga, all of Suwa, Japan

[73] Assignee: Seiko Epson Corporation, Tokyo, Japan

[21] Appl. No.: 08/894,505

[22] PCT Filed: Nov. 21, 1996

[86] PCT No.: PCT/JP96/03418

§ 371 Date: Aug. 8, 1997

§ 102(e) Date: Aug. 8, 1997

[87] PCT Pub. No.: WO97/19383

PCT Pub. Date: May 29, 1997

[30] Foreign Application Priority Data

Nov. 24, 1995 [JP] Japan .................................... 7-306189
Oct. 14, 1996 [JP] Japan .................................... 8-291047

[51] Int. Cl.[6] .............................. G02C 7/06; G02C 7/02
[52] U.S. Cl. .......................... 351/168; 351/169; 351/176
[58] Field of Search .................................. 351/168, 169, 351/170–172, 176

[56] References Cited

FOREIGN PATENT DOCUMENTS

| A1-0 632 308 | 1/1995 | European Pat. Off. . |
| A 57-158829 | 9/1982 | Japan . |
| A 1-501020 | 4/1989 | Japan . |
| A 2-289818 | 11/1990 | Japan . |
| A 3-244450 | 10/1991 | Japan . |
| A 6-118353 | 4/1994 | Japan . |
| A-2 261 526 | 5/1993 | United Kingdom . |
| WO 93/07525 | 4/1993 | WIPO . |

OTHER PUBLICATIONS

Guilino, G. H., "Design Philosophy for Progressive Addition Lenses" Applied Optics, vol. 32, No. 1, Jan. 1, 1993, pp. 111–117.

*Primary Examiner*—Georgia Epps
*Assistant Examiner*—Jordan M. Schwartz
*Attorney, Agent, or Firm*—Oliff & Berridge, PLC

[57] ABSTRACT

In a multifocal lens for eyeglass provided with visual field areas having different refractive powers, being a distance-vision area and a near-vision area, a multifocal lens for eyeglass (10) is provided, in which the difference of the average surface power D11 of the distance-vision area (11) of the surface (2) on the side of the object and the average surface power D12 of the near-vision area (12) is made mathematically less than the addition power Add. Furthermore, a specific addition power Add is provided by adjusting the average surface power D21 of the distance-vision area of the surface (3) on the side of the eye and the average surface power D22 of the near-vision area. It becomes possible to adjust the average surface powers D11 and D12 of the surface (2) on the side of the object such that the difference of magnification of the distance-vision area and the near-vision area becomes little. Furthermore, it is also possible to make the difference of the average surface powers D11 and D12 of the surface (2) on the side of the object little. Consequently, a multifocal lens can be provided, whereby a comfortable visual field can be obtained, in which there is little jumping and warping of images due to the difference of magnification, and furthermore, the clear-vision area having improved astigmatic aberration is wide, and there is little jumping of images, and the like.

8 Claims, 7 Drawing Sheets

MULTIFOCAL LENS FOR EYEGLASS AND EYEGLASS LENS

BACKGROUND OF THE INVENTION

1. Field of the Invention

The invention relates to a multifocal lens for vision-corrective eyeglass and an eyeglass lens therewith.

2. Description of Related Art

Figure 11A:
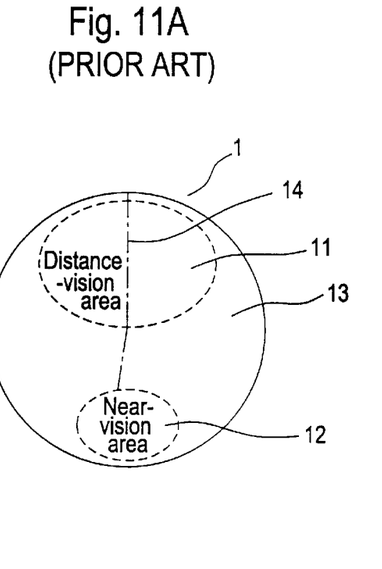
FIG. 11A is an elevational view showing the schematic structure.
Figure 11B:
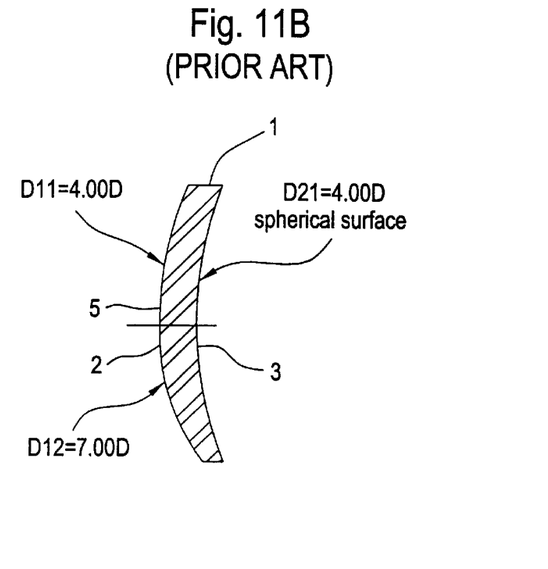
FIG. 11B is a cross-sectional view following the main line of sight.

Because a multifocal lens provided with multiple visual field areas having different refractive powers, for example, a distance-vision area and a near-vision area, can obtain visual fields having different refractive powers with a single lens, it can be used as an eyeglass lens for correcting vision such as aging vision, and the like. Furthermore, one type of multifocal lens is a progressive multifocal lens provided with visual field areas in which the refractivity changes progressively. Because there are no boundaries in the visual field areas, a progressive visual field can be obtained. Furthermore, because it is superior also in external view, it is widely used as an eyeglass lens. FIGS. 11A and 11B show the general structure of a conventional progressive multifocal lens which is widely used as an eyeglass lens. FIG. 11A is an elevational view that shows the progressive multifocal lens 1 is provided with a distance-vision area 11 for viewing objects at a far distance, and a near-vision area 12 for viewing objects at a near distance, the refractive power of which is different from that of distance-vision area 11. The near vision area 12 is provided below distance-vision area 11. Also, the distance-vision area 11 and near-vision area 12 are connected smoothly by a progressive area 13, which is a visual field area for viewing objects at an intermediate distance. The progressive area 13 is endowed with a refractive power that changes continuously.

FIG. 11B is a sectional view and shows that in a one-piece lens 1 used for an eyeglass, there are two surfaces, being a refractive surface 3 on the side of the eye and a refractive surface 2 on the side of the viewed object. It is necessary to provide these surfaces with all the performance required for an eyeglass lens, for example, a vertex power meeting the user's prescription, a cylinder power for correcting astigmatism, an addition power for correcting aging vision, and furthermore a prism power for correcting skew. Therefore, a conventional multifocal lens 1 includes a distance-vision area 11 and near-vision area 12, and the surface power is adjusted by changing the curvature of refractive surface 2 on the side of the object. A progressive multifocal lens further includes a progressive area 13. Also, a toric surface is provided on the refractive surface 3 on the side of the eye when correction of astigmatism is necessary. For simplicity, the explanation is given below, assuming a progressive multifocal lens that does not perform correction of astigmatism.

Figure 12:
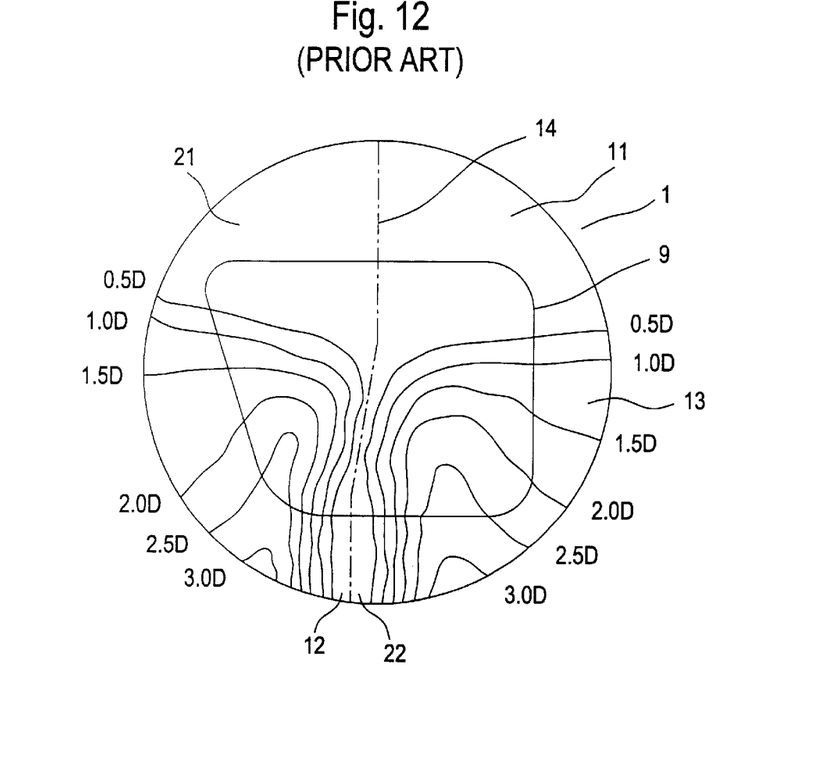
FIG. 12 shows aberration of the progressive multifocal lens shown in FIGS. 11A and 11B.

The astigmatic aberration obtained with a conventional progressive multifocal lens is shown in FIG. 12. The progressive refractive surface 5 provided on the surface 2 on the side of the object is a non-spherical surface so as to change continuously the surface refractive power. Thus, curvature changes according to each area of the surface. For example, a schematic configuration of a progressive multifocal lens in which the refractive power of distance-vision area 11 is 0.00D and the addition power Add is 3.00D. However, when the average surface power D11 of distance-vision area 11 is set to 4.00 diopters (D), the average surface power of near-vision area 12 becomes 7.00D. Consequently, on surface 2 on the side of the object, an astigmatic aberration is caused because a difference of curvature is created between the x direction (the direction that is horizontal when the eyeglass is worn) and the y direction (the direction that is vertical along the lens perpendicular to the x direction), crossing from distance-vision area 11 to near-vision area 12. Meanwhile, surface 3 on the side of the eye may be a spherical surface having a constant curvature. The progressive multifocal lens 1 of the present example may include a spherical surface endowed with an average surface power D21 which is the same as the average surface power of distance-vision area 11, namely, 4.00D. Therefore, the surface on the side of the eye has a constant curvature in the x and y directions, and fundamentally does not cause an astigmatic aberration. Consequently, in lens 1 shown in FIGS. 11A and 11B, the astigmatic aberration of the entirety of the lens is the same as the astigmatic aberration of surface 2 on the side of the object. Astigmatic aberration is represented in diopter (D) units, and the drawing of astigmatic aberration shown in FIG. 12 has the regions of specific diopters connected by contour lines. In the present specification, average surface power indicates the surface refractive power in the vicinity of the main line of sight. Average surface power D11 of the distance-vision area of the surface on the side of the object is the average surface power in the vicinity of main line of sight 14 of distance-vision area 11 of the surface on the side of the object. Also, average surface power D12 of the near-vision area indicates the average surface power in the vicinity of main line of sight 14 of near-vision area 12 of the surface on the side of the object.

A user not having astigmatism can obtain clear vision without perceiving so much the fading of an image if the astigmatic aberration appearing in the lens is 1.0 diopters or less, preferably 0.5 diopters or less. Therefore, in progressive multifocal lens 1, a comparatively wide clear-vision region 21 having an astigmatic aberration of 1.0 diopters or less, or preferably 0.5 diopters or less, is placed in distance-vision area 11 in which the range of eye movement is great. Furthermore, the required clear-vision region following this main line of light 14 is secured by making the difference of curvature of the x direction and y direction substantially zero in the vicinity of main line of sight 14, which extends from distance-vision area 11 toward near-vision area 12, bending somewhat on the side of the nose and crowding the vision. Also, an eyeglass lens 9 is formed by globe processing lens 1 into a shape matching an eyeglass frame, and is provided to the user.

In a multifocal lens such as a progressive multifocal lens, and the like, jumping and warping occurs more easily as the prescription for correcting vision is greater. Furthermore, if the addition power Add, which indicates the difference of refractive power between the distance-vision area and the near-vision area, is great, jumping and warping of images becomes even greater because the difference of curvature between the distance-vision area and the near-vision area differs greatly. In a progressive multifocal lens, the astigmatic aberration appearing in the lens also becomes greater, and the clear-vision area becomes narrower because the progressive refractive surface is made even more non-spherical. Also, in the region where the astigmatic aberration varies greatly, a comfortable visual field cannot be obtained because the images warp and jump following the movement of the line of sight. Therefore, a progressive refractive surface that should provide the user with a comfortable visual field is improved by improving the shape of the progressive refractive surface, by removing the region in which the astigmatic aberration appears greatly from the commonly used regions of the lens, and by preventing sudden variation of the astigmatic aberration.

Furthermore, in a multifocal lens, jumping and warping of images is also caused by differences in refractive power (power) between the distance-vision area and the near-vision area. That is, distance-vision area 11 has a refractive power whereby the focus meets in the distance, meanwhile, near-vision area 12 has a refractive power different from that of distance-vision area 11 whereby the focus meets nearby. Consequently, the magnifications also are not the same, and when a progressive area 13 is provided, it causes the acquired images to jump and be distorted when the eyeglass is worn because the magnification gradually varies in the progressive area 13.

SUMMARY OF THE INVENTION

Thus, an object of the invention is to provide a multifocal lens and eyeglass lens whereby jumping and warping is further controlled and a more comfortable visual field can be obtained. It is also an object of the invention to provide a progressive multifocal lens or bifocal lens, in which the astigmatic aberration is improved substantially to the limit through computer-assisted design of the progressive refractive surface. That is, the object of the invention is to provide a multifocal lens and eyeglass lens whereby the astigmatic aberration can be improved more so than the limit that can be obtained with a state-of-the-art progressive refractive surface. Also, the object of the invention is to provide a multifocal lens and eyeglass lens whereby the difference of magnification can be improved while having a refractive power for correction of vision, and the jumping and warping of images caused by the difference of magnification can be reduced.

As explained above, in a conventional multifocal lens for eyeglass, two visual field areas having different refractive powers are formed. For example, a distance-vision area is formed as a first visual field area, provided on the surface on the side of the object with an average surface power in order to form a visual field area in which it is easy to focus at a distance. A near-vision area is formed as a second visual field area, provided on the surface on side of the object with an average surface power having added an addition power over the average surface power of the distance-vision area in order to form a visual field in which it is easy to focus nearby. As opposed to this, in the invention, a multifocal lens for eyeglass is provided that is manufactured by a design policy entirely different from the design policy of the above-mentioned conventional multifocal lens for eyeglass, in which the average surface power of the near-vision area, being the second visual field area of the surface on the side of the object, is less than the value having added the addition power to the average surface power of the distance-vision area, being the first visual field area. That is, the difference between the average surface power of the distance-vision area of the surface on the side of the object and the average surface power of the near-vision area is a value mathematically smaller than the addition power. Furthermore, in a multifocal lens for eyeglass of the invention, a multifocal lens for eyeglass is provided, in which the entirety of the lens is endowed with a specific addition power by controlling the average surface power of the distance-vision area, being the first visual field area of the surface on the side of the eye, and the average surface power of the near-vision area, being the second visual field area.

That is, a multifocal lens for eyeglass of the invention that has first and second visual field areas having different refractive powers is characterized in that, when the value having subtracted the refractive power of the first visual field area from the refractive power of the second visual field area is taken as the addition power Add, the average surface power D11 of the first visual field area of the surface on the side of the object and the average surface power D12 of the second visual field area, and the average surface power D21 of the first visual field area of the surface on the side of the eye and the average surface power D22 of the second visual field area, satisfy the following relationships, $$-(L \cdot n/t) \text{Add} < D12 - D11 < \text{Add} \quad (1)$$

$$D21 - D22 = \text{Add} - (D12 - D11) \quad (2)$$

wherein, L is the distance from the vertex in units of meters (m), t is the center thickness of the multifocal lens for eyeglass in units of meters (m), and n is the refractivity of the multifocal lens for eyeglass. A multifocal lens for eyeglass of the invention includes, of course, a multifocal lens such as a bifocal lens, as well as a progressive multifocal lens having a progressive area whereby the refractive power between the first and second visual field areas changes progressively. Consequently, in a progressive multifocal lens of the invention, a multifocal lens is also included, which is provided with progressive refractive surfaces on both surfaces, being the surface on the side of the object and the surface on the side of the eye.

According to such a multifocal lens for eyeglass of the invention, having a design policy different from conventional lenses, because the difference of magnification between the distance-vision area and the near-vision area can be reduced, and because the properties of aberration can be improved over conventional lenses, it becomes possible to provide a multifocal lens for eyeglass that minimizes jumping and warping of images and an eyeglass lens having globe-processed this lens.

First, when explaining the difference of magnification of the distance-vision area and the near-vision area, the magnification SM of a lens is generally represented by the following equation.

$$SM = Mp \times Ms \quad (3)$$

Here, Mp is the power factor, and Ms is the shape factor. If distance from the vertex L is the distance to the eye from the vertex (inner vertex) of the surface of the lens on the side of the eye, Po is the refractive power (inner vertex power) of the inner vertex, t is the center thickness of the lens, n is the refractivity of the lens, and Pb is the refractive power (base curve) of the surface of the lens on the side of the object, these values are represented as follows.

$$Mp = 1/(1 - L \times Po) \quad (4)$$

$$Ms = 1/(1 - (t \times Pb)/n) \quad (5)$$

In the computation of Equations (4) and (5), diopters (D) are used for the inner vertex power Po and the refractive power of the surface on the side of the object Pb, and meters (m) are used for distance L and thickness t. As is clear from these equations, in a multifocal lens, the magnification SM1 of the distance-vision area and the magnification SM2 of the near-vision area differ because the refractive power Po differs between the distance-vision area and the near-vision area. The size of an image visualized by the user also differs according to this difference of magnification. Consequently, this difference of magnification also causes jumping and warping of images, and the like, in the distance-vision area and the near-vision area.

As opposed to this, a multifocal lens for eyeglass of the invention is a multifocal lens in which the average surface powers D12 and D11 are controlled such that the difference of magnification between the average surface power D11 of the distance-vision area of the surface on the side of the object and the average surface power D12 of the near-vision area is less than the addition power Add. Therefore, it becomes possible to adjust the shape factor Ms represented in Equation (5). Consequently, it is possible to reduce the difference of magnification due to the power factor Mp represented in Equation (4), and it is possible to reduce the difference of magnification between the distance-vision area and the near-vision area. Meanwhile, the vertex power Po contributes to correction of vision in the distance-vision area and near-vision area, and even if the average surface power D12 of the near-vision area of the surface on the side of the object is less than the value having added the addition power Add to the average surface power D11 of the distance-vision area, in a multifocal lens for eyeglass of the invention, it is possible to provide a multifocal lens having a specific vision-corrective function by controlling the average surface powers D21 and D22 of the surface on the side of the eye. Consequently, by using a multifocal lens of the invention, it becomes possible to establish the average surface powers D11 and D12 of the surface on the side of the eye by controlling the difference of magnification between the distance-vision area and the near-vision area. Also, even in a progressive multifocal lens provided with a progressive area, it is possible to control the variation of magnification in the progressive area. Therefore, warping and jumping of images caused by the difference of magnification can be reduced.

Thus, the multifocal lens for eyeglass of the invention reduces the difference of magnification between the distance-vision area and the near-vision area, as opposed to a conventional multifocal lens for eyeglass which adjusts the refractive power of the distance-vision area and near-vision area only according to the refractive power of the surface on the side of the object. The details are explained below. However, to reduce the difference of magnification, it is desirable that the average surface powers D11 and D12 on the side of the object be set within the range indicated by the above Equation (1). Even when the difference between the average surface powers D12 and D11 of the surfaces on the side of the near-vision area and distance-vision area, that is, the second and first visual field areas, are in a range not meeting the above-mentioned Equation (1), it is possible to reduce the difference of magnification between the first and second visual field areas. However, when it is below the range of the above-mentioned Equation (1), because the lens becomes thicker, and the astigmatic aberration becomes greater, it becomes less useful as a multifocal lens for eyeglass. Therefore, it is desirable that the difference between the average surface powers D12 and D11 of the surfaces of the second and first visual field areas on the side of the object be in the range of the above-mentioned Equation (1).

Also, for the average surface powers D21 and D22 of the surface on the side of the eye, a value can be determined such that a specific prescription and addition power are satisfied using average surface powers D11 and D12 established in the above-mentioned range, and the relationship between the average surface powers D21 and D22 of the surface on the side of the eye becomes as indicated in the above-mentioned Equation (2).

Furthermore, for a multifocal lens for eyeglass of the invention, because the difference between the average surface power D11 of the distance-vision area of the surface on the side of the eye and the average surface power D12 of the near-vision area is less than the addition power Add, the difference of the average surface powers D12 and D11 between the near-vision area and distance-vision area on the side of the object can be made to be smaller than that of a conventional multifocal lens for eyeglass. That is, in a multifocal lens for eyeglass of the invention, the average surface power D11 of the distance-vision area of the surface on the side of the object and the average surface power D12 of the near-vision area can be made to be within the range of the following Equation (6).

$$0 < D12 - D11 < Add \quad (6)$$

By establishing the average surface powers D11 and D12 of the distance-vision area and near-vision area within such a range, the difference of the average surface powers between the distance-vision area and near-vision area on the side of the object can be reduced, and the variation of the curvature (difference of average surface power) of the surface on the side of the object can be reduced. Also, because the difference of curvature between the distance-vision area and near-vision area for realizing the addition power Add can be distributed also on the surface of the lens on the side of the eye, it becomes possible to improve the astigmatic aberration more than that of a conventional multifocal lens. Consequently, in a multifocal lens for eyeglass of the invention, because the astigmatic aberration also can be improved, in addition to the effect of being able to reduce the difference of magnification, it becomes possible to provide a multifocal lens for eyeglass and eyeglass lens endowed with a comfortable visual field in which jumping and warping of images is reduced in the distance-vision area and near-vision area, or in the progressive area.

Thus, a conventional multifocal lens for eyeglass is made such that vision-corrective functions such as prescriptions other than for the purpose of correction of astigmatism, and the addition power Add, and the like, are obtained according to the difference of average surface powers of only the convex surface on the side of the object. As opposed to this, in a multifocal lens of the invention, a specific addition power Add can be obtained by variously controlling the average surface powers of the first visual field area (e.g., distance-vision area) and second visual field area (e.g., near-vision area) on both surfaces, being the surface on the side of the object and the surface on the side of the eye. Consequently, it is possible to reduce the difference of average surface powers between the distance-vision area and near-vision area of the surfaces on both sides, and by reducing the difference of curvatures between these distance-vision and near-vision areas, the astigmatic aberration in the distance-vision area, near-vision area, and even the progressive area, caused by the difference of curvatures, can be made less. Consequently, a multifocal lens can be provided in a lens having the identical conditions such as prescription and addition power, in which the clear-vision region is wider, and jumping of images, and the like, when the line of sight has moved is reduced.

In order to reduce astigmatic aberration and secure a large clear-vision region, it is desirable that the average surface powers D11, D12, D21, and D22 be established so as to make the difference DD1 of the average surface powers of the surface on the side of the object, having subtracted the average surface power D11 from the average surface power D12, become substantially equal to the difference DD2 of the average surface powers of the surface on the side of the eye, having subtracted the average surface power D22 from the average surface power D21. By setting the differences DD1 and DD2 of average surface powers to about the same value, the astigmatic aberration caused on the surface on the side of the object and the astigmatic aberration caused on the surface on the side of the eye together can be reduced. Having conducted various test designs, the inventors of the invention were able to confirm that, compared with a conventional lens in which the astigmatic aberration is concentrated on the surface on one side, the astigmatic aberration can be reduced by distributing the astigmatic aberration on the surfaces on both sides, and by composing these surfaces to obtain a lens as a whole, as in a lens of the invention.

Also, in a multifocal lens of the invention, the average surface power of the distance-vision area D11 of the surface on the side of the object and the average surface power D12 of the near-vision area can be made to be the same value. That is, when the average surface power D11 of the distance-vision area and the average surface power D12 of the near-vision area satisfy the following Equation (7), because the surface on the side of the object can be formed as a surface which is easy to manufacture, such as a spherical surface, it becomes possible to provide in a short time and inexpensively a multifocal lens of the invention in which the difference of magnification between the distance-vision area and near-vision area is minimal. Consequently, a customized eyeglass lens matched to the individual conditions of each user can be provided.

$$D12-D11=0 \quad (7)$$

Furthermore, in a multifocal lens for eyeglass of the invention, because the average surface powers D11 and D12 of the first and second visual field areas of the surface on the side of the object and the average surface powers D21 and D22 of the surface on the side of the eye can be controlled, it is possible to reduce the burden on the vision of the user who uses the eyeglass by establishing each average surface power such that the magnifications of the distance-vision area and near-vision area, that is, the first visual field area and second visual field area, become substantially equal, or such that the difference of magnification from that of the naked eye is reduced. In such a case, the average surface powers D11 and D12 may be selected such that the magnifications of the first and second visual field areas, the distance-vision area and near-vision area, become equal, or such that they approach 1, being the magnification of the naked eye. For example, to make the magnifications of the near-vision area and distance-vision area equal to the magnification of the naked eye, the magnification SM1 of the distance-vision area and the magnification SM2 of the near-vision area may be made such that they approach the following relationships based on Equation (3).

$$SM1=SM2=1$$

$$Mp1 \times Ms1 = Mp2 \times Ms2 = 1 \quad (8)$$

Thus, for the multifocal lens of the invention, the astigmatic aberration and difference of magnification of the first and second visual field areas can be reduced by adjusting the refractive powers of the first and second visual fields of both the surface on the side of the object and the surface on the side of the eye. Consequently, it is possible to provide a progressive multifocal lens and eyeglass lens whereby the jumping and warping of images is further reduced, crossing the limit of a conventional progressive multifocal lens, in which the astigmatic aberration is improved and the optical properties are improved by improving the properties of only a single progressive refractive surface. Furthermore, it is possible to provide the user with a visual field being one level more comfortable. In particular, in a progressive multifocal lens having a large addition power, jumping and warping can be reduced to a great extent.

BRIEF DESCRIPTION OF THE DRAWINGS

FIGS. 1A and 1B show the schematic structure of a progressive multifocal lens of the first embodiment of the invention, wherein

FIGS. 4A and 4B show the schematic structure of a progressive multifocal lens of the second embodiment of the invention, wherein

FIGS. 9A and 9B show the schematic structure of a progressive multifocal lens of the third embodiment of the invention, wherein

FIGS. 10A and 10B show a different example of the progressive multifocal lens of the third embodiment of the invention, wherein

FIGS. 11A and 11B show the schematic structure of a conventional progressive multifocal lens, wherein

DETAILED DESCRIPTION OF PREFERRED EMBODIMENTS

[First Embodiment]

Figure 1A:
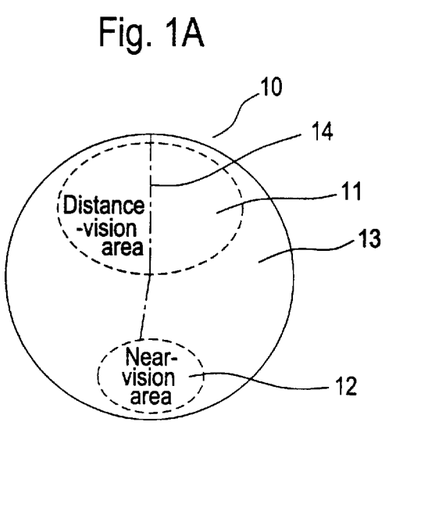
FIG. 1A is an elevational view showing the schematic structure.
Figure 1B:
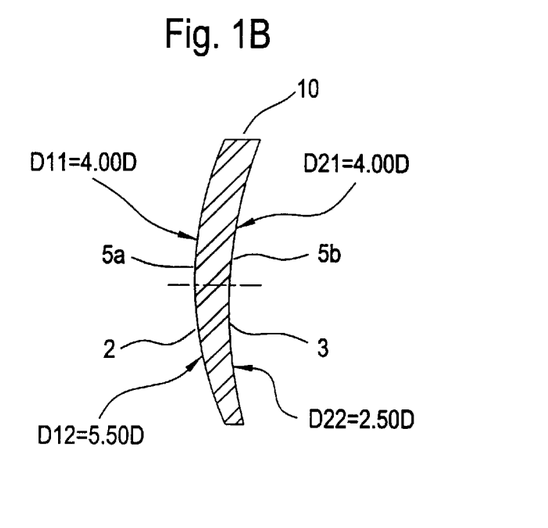
FIG. 1B is a cross-sectional view following the main line of sight.

The invention is explained in further detail below while referring to the drawings showing the embodiments. FIGS. 1A and 1B show a progressive multifocal lens 10 as an example of a multifocal lens of the invention, provided with progressive refractive surfaces 5a and 5b on the surface 2 on the side of the object and the surface 3 on the side of the eye, respectively. The progressive multifocal lens 10 of the present example is a progressive multifocal lens provided above with a distance-vision area 11, which is a visual field area for viewing objects at a far distance, and provided below with a near-vision area 12, which is a visual field area for viewing objects at a near distance, and endowed with a refractive power different from that of the distance-vision area 11. The distance-vision area 11 and near-vision area 12 are connected by a progressive area 13 in which the refractive power changes continuously, in the same manner as the conventional progressive multifocal lens shown in FIGS. 11A and 11B. As shown in FIG. 1B, the progressive multifocal lens 10 of the present example is a multifocal lens in which the average surface power D11 of the distance-vision area 11 on the side of the object is set to 4.00D, the average surface power D12 of the near-vision area 12 is set to 5.50D, the average surface power D21 of the distance-vision area 11 on the side of the eye is set to 4.00D, the average surface power D22 of the near-vision area is set to 2.50D, and the addition power Add of the near-vision area 12 in relation to the distance-vision area 11 is 3.00D. Consequently, the progressive multifocal lens of the present example is a multifocal lens related to the invention, in which the difference of average surface power D11 of the distance-vision area 11 on the side of the object and the average surface power D12 of the near-vision area is less than the addition power Add. Furthermore, because the refractive power of the distance-vision area 11 is 0.00D and the addition power Add is 3.00D, the progressive multifocal lens 10 of the present example is a lens endowed with the identical vision-corrective functions as those of the progressive multifocal lens 1 shown in FIGS. 11A and 11B.

The magnifications of the distance-vision area 11 and near-vision area 12 of the progressive multifocal lens 10 of the present example become as follows when the magnifications SM1 and SM2 of the respective visual field areas are sought by applying Equations (3), (4) and (5) described above to the distance-vision area 11 and near-vision area 12. First, the magnification SM1 of the distance-vision area 11 is expressed as follows.

$$SM1 = Mp1 \times Ms1 \tag{9}$$

Here, Mp1 is the power factor of the distance-vision area, Ms1 is the shape factor of the distance-vision area, and these values become as follows when considering that the surface power Pb appears as the average surface power D11 of the surface 2 on the side of the object.

$$Mp1 = 1/(1 - L \times Po) \tag{10}$$

$$Ms1 = 1/(1 - (t/n) \times D11) \tag{11}$$

In the same manner, the magnification SM2 of the near-vision area 12 is expressed as follows.

$$SM2 = Mp2 \times Ms2 \tag{12}$$

$$Mp2 = 1/(1 - L \times (Po + \text{Add})) \tag{13}$$

$$Ms2 = 1/(1 - (t/n) \times D12) \tag{14}$$

Here, Mp2 is the power factor of the near-vision area, Ms2 is the shape factor, surface power Pb appears in the average surface power D12 of the surface 2 on the side of the object, and the refractive power of the near-vision area 12 is the value having added the addition power Add to the refractive power of the distance-vision area 11.

When the distance from the vertex L is set to 15.00 mm (0.0150 m), the center thickness t is set to 3.0 mm (0.0030 m), and the refractivity n is set to 1.662, in the progressive multifocal lens 10 of the present example, because the inner vertex power Po is 0.0D, the additive (join) degree Add is 3.00D, the average surface power D11 of the distance-vision area is 4.00D, and the average surface power D12 of the near-vision area is 5.50D, the respective magnifications SM1 and SM2 and the difference of magnification become as follows.

SM1=1.007, SM2=1.058, $$SM2 - SM1 = 0.051 \tag{15}$$

As opposed to this, in the conventional progressive multifocal lens shown in FIGS. 11A and 11B, because the average surface power D12 of the near-vision area is 7.00D, the respective magnifications SM1 and SM2, and the difference of magnification become as follows.

SM1=1.007, SM2=1.061, $$SM2 - SM1 = 0.054 \tag{16}$$

Thus, in the progressive multifocal lens of the present example, it is clear that the difference of magnification between the distance-vision area 11 and the near-vision area 12 is alleviated by as much as 6% over the conventional lens, and that a visual field having less warping and jumping of images can be provided to the user. Thus, for the progressive multifocal lens 10 as described above, the difference of magnification between the distance-vision area 11 and the near-vision area 12 is reduced compared with the conventional lens 1, and a comfortable visual field having minimal jumping can be provided to the user.

In a multifocal lens of the invention, when the range in which the difference of magnification between the distance-vision area 11 and the near-vision area 12 can be reduced is examined, it becomes as follows. For example, when eliminating the difference of magnification between the distance-vision area 11 and the near-vision area 12, it becomes as follows from the above-mentioned Equations (9) and (12).

$$Mp1 \times Ms1 = Mp2 \times Ms2 \tag{17}$$

By assigning and transforming Equations (10), (11), (13), and (14), they become as follows.

$$(1 - L \times Po) \cdot (1 - (t/n) \times D12) = (1 - L \times (Po + \text{Add})) \cdot (1 - (t/n) \times D12) \tag{18}$$

Furthermore, because the distance from the vertex L and t/n of Equation (18) are functions having two or three places following the decimal point, if the secondary terms obtained by expansion are ignored (deleted), the difference DD1 (D12−D11) of the average surface powers obtained for the distance-vision area and near-vision area, in which the difference of magnification is substantially equal, becomes approximately as follows.

$$D12 - D11 = -(L \cdot n/t) \times \text{Add} \tag{19}$$

Furthermore, in a conventional multifocal lens, the relationship between the difference DD1 of the average surface power D11 of the distance-vision area 11 and the average surface power D12 of the near-vision area 12, and the addition power Add satisfies the following relationship as explained above.

$$D12 - D11 = \text{Add} \tag{20}$$

Consequently, in a multifocal lens of the invention, expressed with the following Equation (1), because the difference DD1 of the average surface powers is between Equation (19) and Equation (20), it is clear that a multifocal lens having a difference of magnification less than that of a conventional multifocal lens can be provided.

$$-(L \cdot n/t) \text{Add} < D12 - D11 < \text{Add} \tag{21}$$

That is, it becomes possible to provide a multifocal lens, in which the average surface power D11 of the distance-vision area of the surface on the side of the object and the average surface power D12 of the near-vision area are within the conditional range of the above-mentioned Equation (1), the difference of magnification is less than that of the conventional lens, and the jumping and warping of images consequent to that is minimal. Even when in a range in which the difference of the average surface power D12 of the near-vision area and the average surface power D11 of the distance-vision area is less than that of the above-mentioned Equation (1), that is, a range not reaching the lower limit of the above-mentioned Equation (1), the difference of magnification between the distance-vision area and the near-vision area can be reduced compared with that of a conventional multifocal eyeglass lens. Nevertheless, if the difference between the average surface powers D12 and D11 is lower than the range of the above-mentioned Equation (1), because the lens becomes thicker and astigmatic aberration becomes greater, it becomes less useful as a multifocal lens for eyeglass.

Also, the average surface power D21 of the distance-vision area 11 of the surface on the side of the eye and the average surface power D22 of the near-vision area 12 can be determined so as to satisfy a specified prescription and addition power by using average surface powers D11 and D12 established within the range of Equation (1), and the relationship between the average surface powers D21 and D22 of the surface on the side of the eye becomes as shown in Equation (2) below.

$$D21 - D22 = \text{Add} - (D12 - D11) \tag{2}$$

However, in the above-mentioned Equations (1) and (2), L is the distance from the vertex in units of meters (m), t is the center thickness of the multifocal lens for eyeglass in units of meters (m), and n is the refractivity of the multifocal lens for eyeglass.

Furthermore, in a multifocal lens of the invention, by taking the average surface powers D11 and D12 of the surface on the side of the object into the range of the following Equation (6), the difference DD1 of the average surface power D11 of the distance-vision area and the average surface power D12 of the near-vision area can be made to be smaller than that of a conventional progressive multifocal lens. Therefore, it becomes possible to improve the properties of astigmatic aberration of the surface 2 on the side of the object.

$$0 < D12 - D11 < \text{Add} \tag{6}$$

By establishing the average surface powers D11 and D12 in this range, the difference DD1 of the average refractive powers of the surface on the side of the object can be made to be smaller than the addition power Add. Furthermore, as is clear from Equation (2), the difference DD2 of the average surface power D22 of the near-vision area 12 of the surface on the side of the eye and the average surface power D21 of the distance-vision area 11 also can be made to be smaller than the addition power Add. Consequently, it is possible to improve the properties of astigmatic aberration of the multifocal lens 10 as a whole, both the jumping and warping of images due to the difference of magnification and the jumping and warping of images due to astigmatic aberration can be reduced, and a multifocal lens can be provided, in which the clear-vision region is wide and a one-level more comfortable visual field can be obtained.

Figure 2:
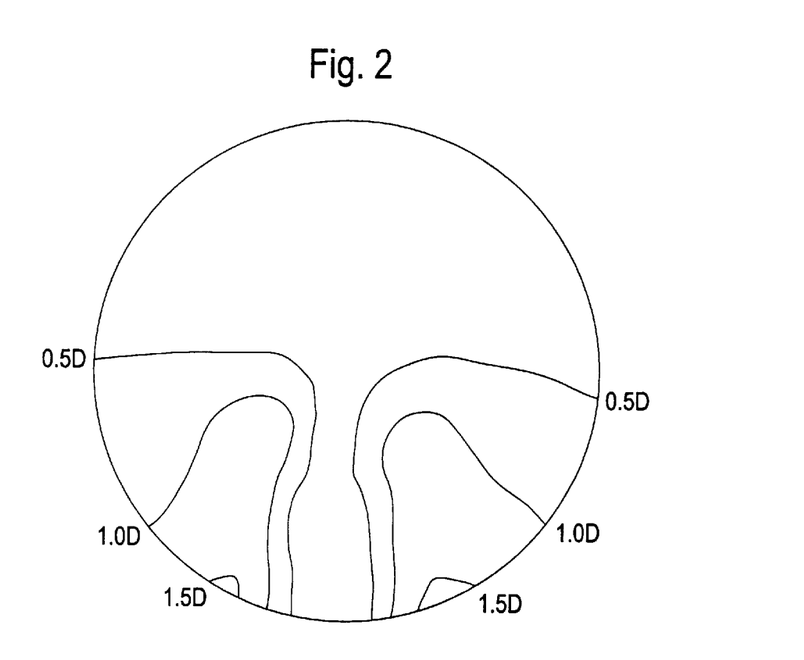
FIG. 2 shows aberration of the surfaces on the side of the object and on the side of the eye of the progressive multifocal lens shown in FIGS. 1A and 1B.

The progressive multifocal lens 10 of the present example shown in FIGS. 1A and 1B is a progressive multifocal lens included within the range of the above-mentioned Equation (6). Furthermore, the example is shown in which the difference DD1 of the average surface powers of the surface 2 on the side of the object and the difference DD2 of the average surface powers of the surface 3 on the side of the eye are equal. FIG. 2 shows the astigmatic aberration obtained on surface 2 on the side of the object and surface 3 on the side of the eye, of the progressive multifocal lens 10 of the present example. For the progressive multifocal lens 10 of the present example, the differences DD1 and DD2 of the average surface powers of the distance-vision area 11 and near-vision area 12 of the surface 2 on the side of the object and the surface 3 on the side of the eye, respectively, are both 1.50D, and by establishing the change of curvature in the progressive area 13 in roughly the same manner, a substantially same drawing of astigmatic aberration can be obtained. Also, the difference DD1 (D12−D11) of the average surface powers of the surface 2 on the side of the object and the difference DD2 (D21−D22) of the average surface powers of the surface 3 on the side of the eye both become half of the 3.00D difference of average surface powers of the conventional progressive multifocal lens 1. Therefore, as shown in FIG. 2, the astigmatic aberration caused on the surface 2 on the side of the object and on the surface 3 on the side of the eye also become extremely small.

Figure 3:
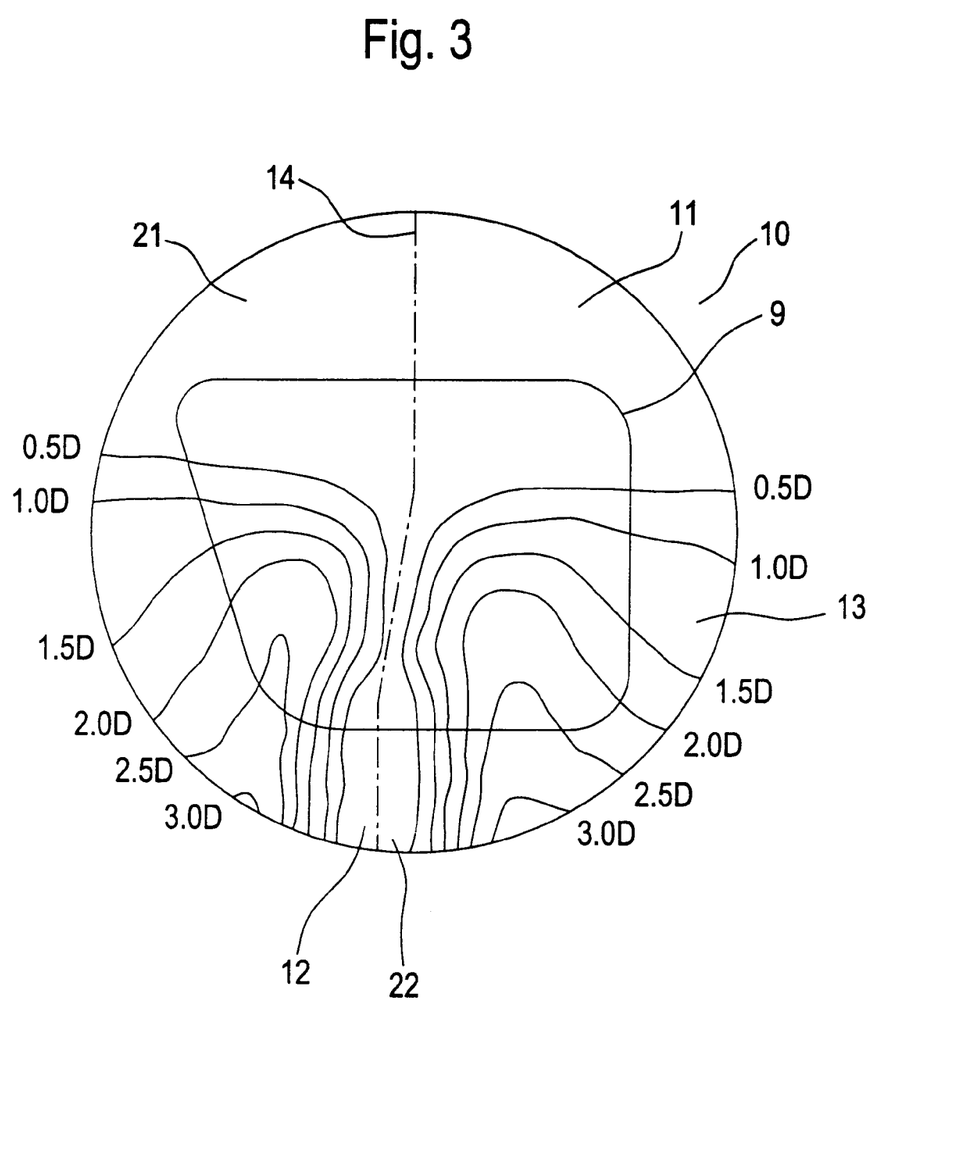
FIG. 3 shows aberration of the entirety of the progressive multifocal lens shown in FIGS. 1A and 1B.

FIG. 3 shows astigmatic aberration obtained for the progressive multifocal lens 10 of the present example. The astigmatic aberration shown in FIG. 3 is a composite of the astigmatic aberrations caused respectively on the surface 2 on the side of the object and the surface 3 on the side of the eye. As is clear when comparing the drawing of aberration of the progressive multifocal lens of the invention shown in FIG. 3 and the drawing of aberration of the conventional progressive multifocal lens 1 shown in FIG. 12, in the progressive multifocal lens 10 of the present example, the line showing the 1.0D astigmatic aberration decreases in the direction of the near-vision area 12, and the clear-vision region in the distance-vision area 11 is widened. Furthermore, it is clear that the position of the line showing the 1.0D astigmatic aberration of the near-vision area 12 also is wider on the left and right than the conventional progressive multifocal lens 1, and the clear-vision region in the near-vision area 12 also is wider. Also, as is clear when comparing the positions of the lines showing the astigmatic aberrations of 1.5D, and the like, the values of the astigmatic aberrations of the progressive multifocal lens 10 of the present example become smaller than the astigmatic aberrations in the same locations of the conventional progressive multifocal lens 1, and the astigmatic aberrations become smaller across the entirety of the lens. Furthermore, it is clear that the intervals of the lines connecting the locations of equal astigmatic aberration are wider for the progressive multifocal lens 10 of the present example, and the variation of the astigmatic aberration also becomes less. Thus, the progressive multifocal lens 10 of the present example is improved in all aspects over the conventional progressive multifocal lens 1 when the distribution of astigmatic aberration is compared. Consequently, by globe-processing the progressive multifocal lens 10 of the invention so as to match the shape of an eyeglass frame, an eyeglass lens 9 can be manufactured and supplied, that can provide to the user a one-level wider and clearer visual field and images having minimal jumping and warping.

For the progressive multifocal lens 10 of the present example, the difference DD1 of the average surface powers of the surface on the side of the object and the difference DD2 of the average surface powers of the surface on the side of the eye are established identically, and the differences of curvature on the surface 2 on the side of the object and the surface 3 on the side of the eye become identical. Consequently, because the burdens of the differences of curvature appearing as properties of aberration are about the same, it is believed that these are conditions whereby the properties of aberration can be most improved as a progressive multifocal lens 10 including the surface 2 on the side of the object and the surface 3 on the side of the eye.

Not being limited to the progressive multifocal lens of the present example, it is obvious that the properties of aberration can be improved in a progressive multifocal lens, in which the differences DD1 and DD2 of the average surface powers are different, if they are within the range shown in the above-mentioned Equation (6). When compared with the conventional progressive multifocal lens 1, in which the difference DD1 of the average surface powers of the surface on the side of the object is equal to the addition power Add, in the progressive multifocal lens 10 pertaining to the invention, it is possible to reduce the difference DD1 of the average surface powers on the side of the object more than the conventional lens by providing a difference DD2 of the average surface powers of the surface on the side of the eye. Thus, astigmatic aberration can be controlled. An astigmatic aberration is caused on the surface 2 on the side of the eye by providing a difference DD2 of the average surface powers on the surface on the side of the eye. Nevertheless, the fact is as shown above, that by reducing the share of the surface on the side of the object, improving astigmatic aberration on one surface can improve the astigmatic aberration of the progressive multifocal lens 10 as a whole. Consequently, by providing a difference to the average surface powers D21 and D22 of the surface on the side of the eye, establishing a difference DD2 of the average surface powers of the surface on the side of the eye, even if it is little, the average surface powers D11 and D12 of the surface on the side can be obtained, having the relationship shown in the above-mentioned Equation (6), and the astigmatic aberration of the progressive multifocal lens 10 can be improved. Of course, within the range of Equation (6), lenses are included in which the difference DD2 of the average surface powers of the surface on the side of the eye is greater than the difference DD1 of the average surface powers of the surface on the side of the object. Even in such multifocal lenses, by providing a difference to the average surface powers of the surface on the side of the object, even more preferable properties of astigmatic aberration can be obtained. Thus, for the progressive multifocal lens of the present example, by establishing the differences DD1 and DD2 of the average surface powers of both surfaces, two surfaces endowed with preferable properties of astigmatic aberration on average can be formed, thereby making it possible to improve to a great extent the astigmatic aberration of the lens as a whole.

Thus, for the progressive multifocal lens 10 of the present example, the difference of magnification of the distance-vision area 11 and the near-vision area 12 can be reduced, and it is possible to improve also the properties of astigmatic aberration. Jumping and warping of images can be controlled, and a wide clear-vision region can be obtained. Consequently, according to the progressive multifocal lens of the present example, a more comfortable visual field can be provided.

[Second Embodiment]

Figure 4A:
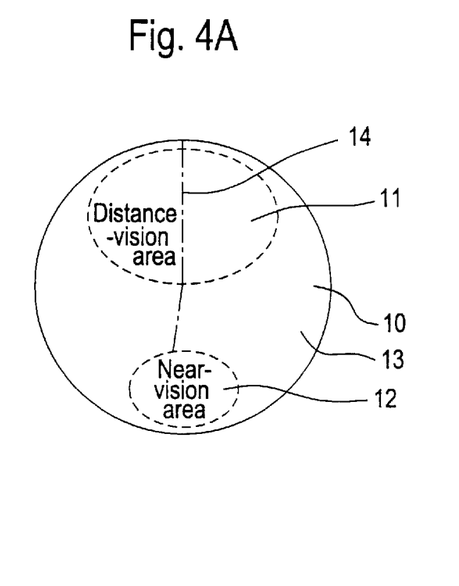
FIG. 4A is an elevational view showing the schematic structure.
Figure 4B:
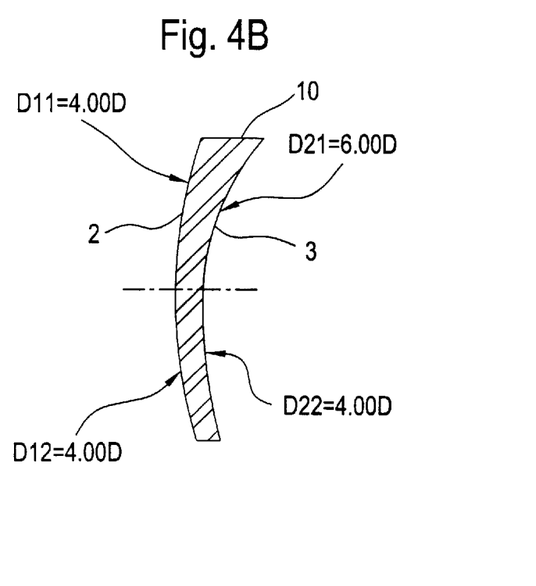
FIG. 4B is a cross-sectional view following the main line of sight.
Figure 5:
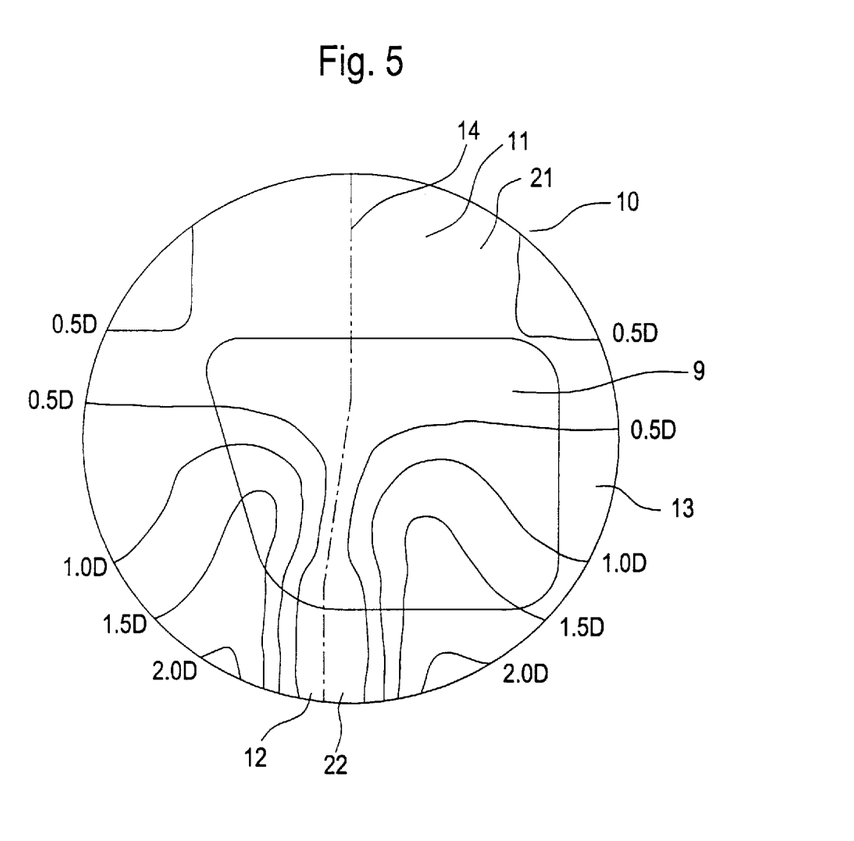
FIG. 5 shows aberration of the surfaces on the side of the object and on the side of the eye of the progressive multifocal lens shown in FIGS. 4A and 4B.

FIGS. 4A and 4B show a different example of a progressive multifocal lens of the invention. The progressive multifocal lens 10 of the present example also is provided with a distance-vision area 11, which is a visual field area for viewing objects at a far distance, and a near-vision area 12, which is a visual field area for viewing objects at a near distance, and endowed with a refractive power different from that of distance-vision area 11, and provided below distance-vision area 11. Also, the distance-vision area 11 and near-vision area 12 are connected smoothly by a progressive area 13, having a refractive power that changes continuously. For the progressive multifocal lens 10 of the present example, the average surface power D11 of the distance-vision area 11 of the surface 2 on the side of the object is set to 4.00D, and the average surface power D12 of the near-vision area 12 is set to 4.00D. Also, the average surface power D21 of the distance-vision area 11 of the surface 3 on the side of the eye is set to 6.00D, the average surface power D22 of the near-vision area is set to 4.00D, and the addition power Add is set to 2.00D. Also, the sphere power S of the distance-vision area is −2.00D, the center thickness t of the lens is 3.0 mm, and the diameter of the lens d is 70.0 mm. Under such conditions, a progressive multifocal lens 10 having an astigmatic aberration such as shown in FIG. 5 can be obtained.

When the difference in magnification between the distance-vision area 11 and the near-vision area 12 of the progressive multifocal lens 10 of the present example is sought using the Equations (3), (4), and (5) explained above, it becomes as follows.

$SM1=0.976, SM2=1.007$ $$SM2-SM1=0.031 \tag{15'}$$

Also, the progressive multifocal lens 10 of the present example corresponds to a lens, in a conventional design wherein 2.00D addition power Add is added to the surface 2 on the side of the object, in which the average surface power D11 of the distance-vision area on the surface 2 on the side of the object is 4.00D, the average surface power D12 of the near-vision area is 6.00D, and the average surface powers D21 and D22 of the distance-vision area and near-vision area of the surface 3 on the side of the eye are both 6.00D. Consequently, when the difference of magnification of the distance-vision area and near-vision area of the conventional progressive lens corresponding to the lens of the present example is sought, it becomes as follows.

$SM1=0.976, SM2=1.011,$ $$SM2-SM1=0.035 \tag{16'}$$

Consequently, in a progressive multifocal lens 10 of the present example, it is clear that the difference of magnification between far and near can be improved as much as 12–13%. In a progressive multifocal lens 10 of the invention, by the fact that the difference of magnification is reduced in this manner, it becomes possible to improve further over the conventional lens the jumping and warping of images arising in a progressive multifocal lens caused by the difference of magnification. Therefore, by globe-processing the progressive multifocal lens 10 of the present example to match an eyeglass frame, a clear eyeglass lens 9 can be provided, in which the jumping and warping are improved to a great extent.

Furthermore, in a progressive multifocal lens of the present example, the average surface power D11 of the distance-vision area 11 on the side of the object and the average surface power D12 of the near-vision area 12 are established equally. That is, the average surface power D11 of the distance-vision area 11 and the average surface power D12 of the near-vision area satisfy the following Equation (7).

$$D12-D11=0 \qquad (7)$$

Therefore, it is possible to configure the surface 2 on the side of the object as an extremely simple spherical surface, and by using a progressive multifocal lens 10 whereby the manufacturing can be performed simply, an eyeglass lens can be provided inexpensively, being an eyeglass lens meeting the specifications of each user, in which a comfortable visual field having minimal jumping and warping of images can be obtained.

Figure 6A:
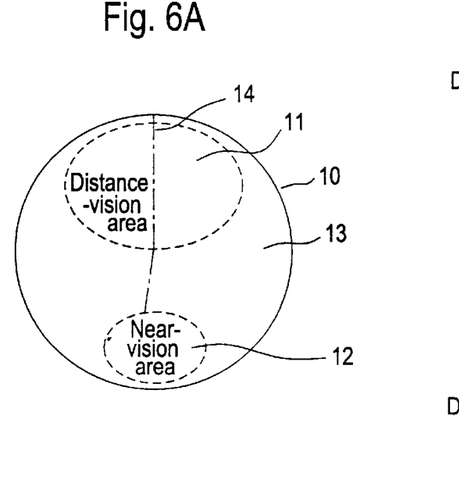
FIGS. 6A and 6B show the essential components of a progressive multifocal lens having added the essential components as a toric surface to the progressive multifocal lens shown in FIGS. 4A and 4B.
Figure 6B:
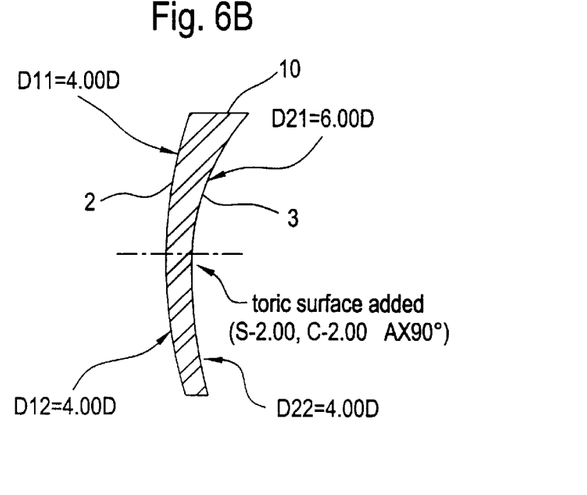

The invention has been explained above with embodiments of progressive multifocal lenses that do not perform correction of astigmatism. However, it is of course possible to provide a toric surface for correcting astigmatism to the refractive surface 3 on the side of the eye. FIGS. 6A and 6B show a progressive multifocal lens 10 in which the properties of a toric surface 6 for correcting astigmatism are added to the surface 2 on the side of the eye of the progressive multifocal lens 10 described above. The progressive multifocal lens 10 of the present example is a progressive multifocal lens in which the properties of a toric surface having a 90E axis of astigmatism, a −2.00D sphere power, and a −2.00D cylinder power C are added. The value Z of the z coordinates of the surface 2 on the side of the eye is sought using the following Composite Equation (21) in order to compose the toric surface with a progressive refractive surface in which the average surface power D21 of the distance-vision area 11 of the surface 3 on the side of the eye is 6.00D and the average surface power D22 of the near-vision area is 4.00D.

$$Z=((Cp+Cx)X^2+(Cp+Cy)Y^2)/(1+\sqrt{1-(Cp+Cx)^2X^2-(Cp+Cy)^2Y^2}) \qquad (21)$$

In the above Composite Equation (21), while the eyeglass is being worn, when the axis passing through the center of the progressive refractive surface from the side of the object to the side of the eye is the z axis, the axis orthogonal to the z axis oriented from below to above is the y axis, and the axis orthogonal to the z axis oriented from left to right is the x axis, X and Y indicate the coordinates of arbitrary points of the x and y coordinates, respectively, of the surface on the side of the eye, and Z indicates a z coordinate in the direction perpendicular to the surface on the side of the eye. Also, curvature Cp is the approximate curvature in any point p (X, Y, Z) of the original progressive refractive surface not having the properties of the toric surface added, curvature Cx is the curvature in the x direction of the toric surface for correction of astigmatism, and curvature Cy is the curvature in the y direction. In the present example, the average curvature in the radial direction is used as the approximate curvature Cp, and the reciprocal of the radius of a circle passing through three points, in the xy plane perpendicular to the z axis (passing through the center of the lens or the internal vertex (0, 0, 0)) including any point p (X, Y, Z) on the original progressive refractive surface, being the point p, the point p=(−X, −Y, −Z) rotationally symmetric with point p, and the internal vertex (0, 0, 0), is used. However, when the point p on the original progressive refractive surface is positioned at the internal vertex, the average curvature in the radial direction Cp is not defined, and Z=0 in Equation (21).

An example is described above in which a prescription having established the spherical power of the toric surface was added in the vertical direction (90E axis) of the lens (that is, when a prescription having established the cylinder power of the toric surface was added in the left-right direction of the lens), but it is obvious that the invention is not limited to this example. That is, the direction of the xy axis is not limited to the direction described above, rather it can be established in a suitable direction, and the process described above can be performed with that coordinate system. For example, even when a prescription having established the spherical power of the toric surface is added in the left-right direction of the lens, it is possible to provide a method of composition using Equation (21) of the present example by only applying an operation rotating the directions of the x axis and the y axis, respectively, of the xy coordinates 90E to the left in relation to the example described above. Furthermore, even when a prescription having established the spherical power of the toric surface is added in any direction (including diagonal directions) of the lens, it is possible to provide a method of composition using Equation (21) of the present example by only applying an operation rotating "degrees (" is any angle of 0–360E) the x axis and the y axis, respectively, of the xy coordinates.

Figure 7:
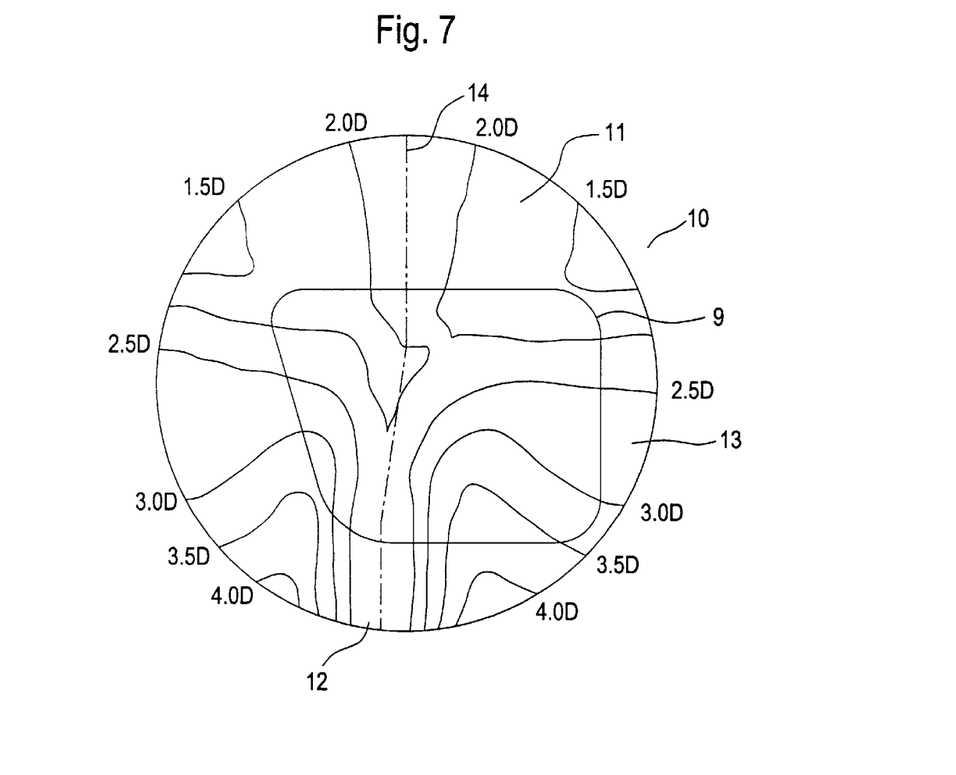
FIG. 7 shows astigmatic aberration of the progressive multifocal lens shown in FIGS. 6A and 6B.

By composing the coordinates of the toric surface with the coordinates of the original progressive refractive surface not having the astigmatism-corrective properties added, using such a Composite Equation (21), a progressive multifocal lens of the invention, endowed with astigmatism-corrective power, can be obtained. This progressive multifocal lens endowed with astigmatism-corrective power is as shown in FIG. 7. In regard to the properties of aberration, properties substantially the same as those of a conventional lens, having the properties as a progressive surface added only to the surface 2 on the side of the object, and having the properties of a toric surface added only to the surface 3 on the side of the eye, can be obtained. Meanwhile, it is also possible to seek the coordinates of the surface 3 on the side of the eye by simply adding the coordinates of the toric surface to the coordinates of the original progressive refractive surface not having the astigmatism-corrective power added. Nevertheless, if simply added coordinates are used, while a 2D astigmatic aberration for the purpose of correction of astigmatism following the main line of sight may be obtained, as shown with the broken line 32 in FIG. 8, it is difficult to secure a stable astigmatic aberration when compared to the case shown with the solid line 31 when the Composite Equation (21) was used. In particular, variation of the astigmatic aberration in the perimeter of the lens is great, and it is difficult to secure an astigmatic aberration for correction of astigmatism. Also, because variation of the astigmatic aberration is comparatively great, it is clear that images tend to jump and warp when the eye has moved along the main line of sight compared with the progressive multifocal lens 10 manufactured using Composite Equation (21).

Figure 8:
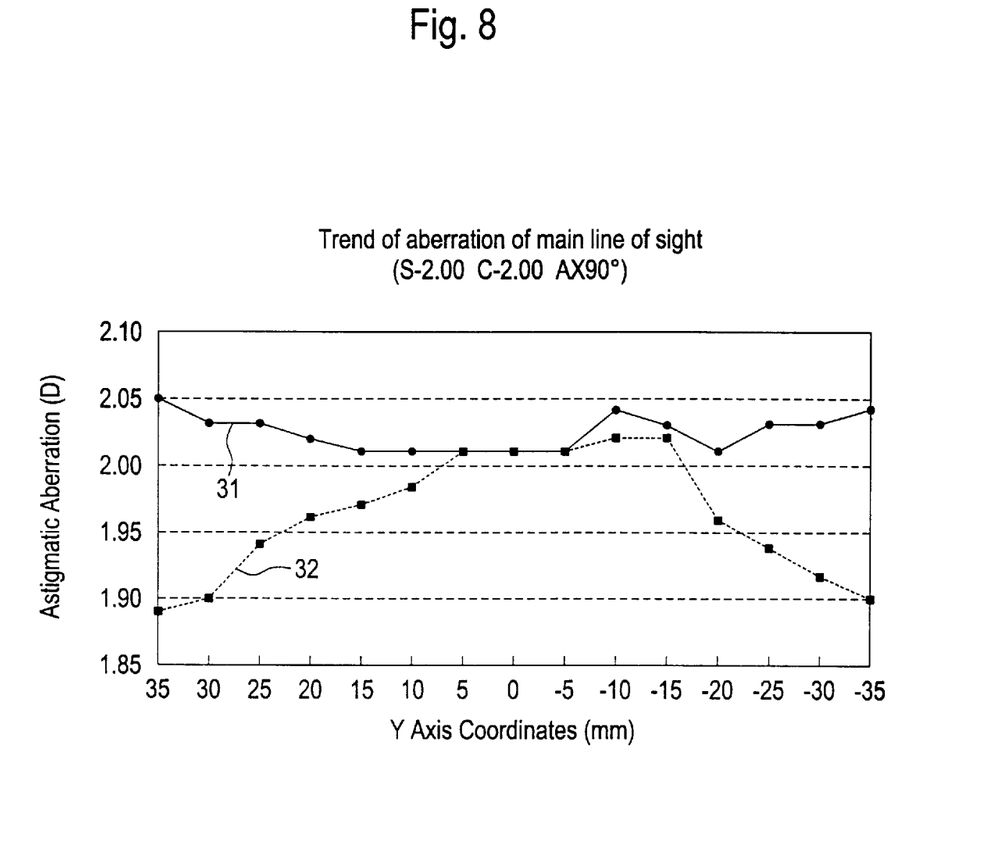
FIG. 8 is a graph contrasting the variation of astigmatic aberration following the main line of sight of the progressive multifocal lens shown in FIGS. 6A and 6B with the variation of astigmatic aberration following the main line of sight of a multifocal lens having computed the toric surface by another method.

As opposed to this, the absolute values of the astigmatic aberration (solid line with black balls 31) following the main line of sight 14, of the progressive multifocal lens 10 for correction of astigmatism manufactured using Composite Equation (21) of the present example, show that a 2D astigmatic aberration that does not hinder the vision-corrective power intended for correction of astigmatism can be secured with extreme stability substantially across the entire region of the main line of sight. Consequently, it is clear that a progressive multifocal lens, endowed with an astigmatism-corrective function, in which a comfortable visual field having little jumping is secured, can be provided by composing the original progressive refractive surface and the toric surface using Composite Equation (21).

Thus, it is possible to add the curvature of a toric surface for correction of astigmatism to the surface 3 on the side of the eye, in which the average surface power D21 of the distance-vision area 11 and the average surface power D22 of the near-vision area 12 differ, and it is possible to provide a multifocal lens for eyeglass having astigmatism-corrective power by using a multifocal lens of the invention, in which the difference of the average surface power D11 of the distance-vision area 11 of the surface 2 on the side of the object and the average surface power D12 of the near-vision area 12 is less than the addition power Add. Consequently, according to the invention, the difference of magnification between the distance-vision area 11 and the near-vision area 12 can be reduced, and it is possible to provide a multifocal lens endowed with astigmatism-corrective power, in which the jumping and warping of images is improved. Consequently, it is possible to include an eyeglass lens for the purpose of correction of astigmatism as one of a line-up of eyeglass lenses based on the invention, and it is possible to provide eyeglass lenses for all users, including those having and not having astigmatism, in which a one-level more comfortable visual field can be obtained.

[Third Embodiment]

Figure 9A:
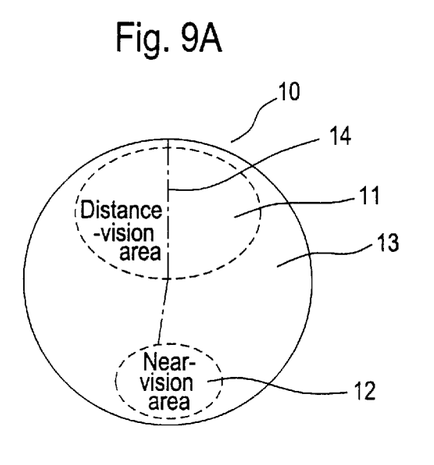
FIG. 9A is an elevational view showing the schematic structure.
Figure 9B:
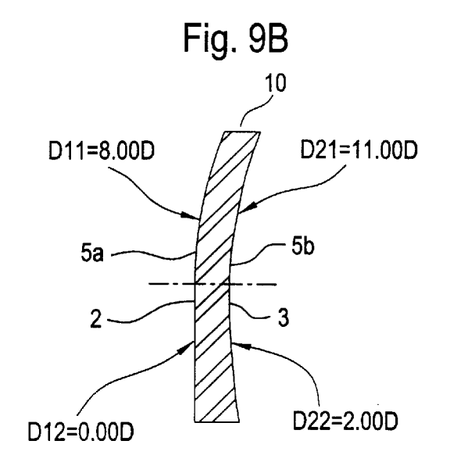
FIG. 9B is a cross-sectional view following the main line of sight.

By using a multifocal lens of the invention, as explained above, it is possible to provide the user with an eyeglass lens in which the difference of magnification between the distance-vision area 11 and the near-vision area 12 is minimal. In the invention, it is further possible to provide a multifocal lens in which there is substantially no difference of magnification between the distance-vision area 11 and the near-vision area 12, and the magnifications SM1 and SM2 of the distance-vision area 11 and the near-vision area 12 are almost the same. FIGS. 9A and 9B show one example of that. The progressive multifocal lens 10 of FIGS. 9A and 9B is a progressive multifocal lens in which the main configuration is almost the same as those of the progressive multifocal lenses described above. The refractive power Po of the distance-vision area is −3.00D, the addition power Add is 1.00D, the average surface power D11 of the distance-vision area of the surface on the side of the object is 8.00D, and the average surface power D21 of the distance-vision area of the surface on the side of the eye is 11.00D. The distance from the vertex L of the progressive multifocal lens 10 of the present example is 15.0 mm (0.0150 m), the center thickness t is 3.0 mm (0.0030 m), and the refractivity n is 1.662. Furthermore, the average surface power D12 of the near-vision area of the surface on the side of the object is 0.00D, and the average surface power D22 of the near-vision area of the surface on the side of the eye is 2.00D. Consequently, the progressive multifocal lens 10 of the present example is a multifocal lens that satisfies the conditions of Equation (1) described above.

When the difference of magnification between the distance-vision area 11 and the near-vision area 12 of the progressive multifocal lens 10 of the present example is sought, it becomes as follows.

SM1=0.97, SM2=0.97

$$SM2-SM1=0.00 \qquad (15'')$$

Consequently, the multifocal lens 10 of the present example is a progressive multifocal lens in which the magnifications of distance-vision area 11 and the near-vision area 12 are equal. By using this multifocal lens, an eyeglass lens can be provided, in which there is no jumping and warping of images due to the difference of magnification.

Furthermore, in the multifocal lens of the invention, it is possible also to make the magnifications of the distance-vision area 11 and the near-vision area 12 approach 1, being the magnification of the naked eye. It is possible to determine the various average surface powers D11, D12, D21, and D22 within the range of the invention, that is, within the range of Equation (1) described above, such that the magnification SM1 of the distance-vision area and the magnification SM2 of the near-vision area satisfy 1 in Equations (9) and (12) described above. For example, in the above-mentioned progressive multifocal lens 10, by setting the average surface power D11 of the distance-vision area of the surface on the side of the object to 24.00D, the average surface power D12 of the near-vision area to 15.70D, furthermore the average surface power D21 of the distance-vision area of the surface on the side of the eye to 27.00D, and the average surface power D22 of the near-vision area to 17.70D, a multifocal lens can be provided, in which the magnification SM1 of the distance-vision area and the magnification SM2 of the near-vision area are 1.00, the same magnification as that of the naked eye.

Figure 10A:
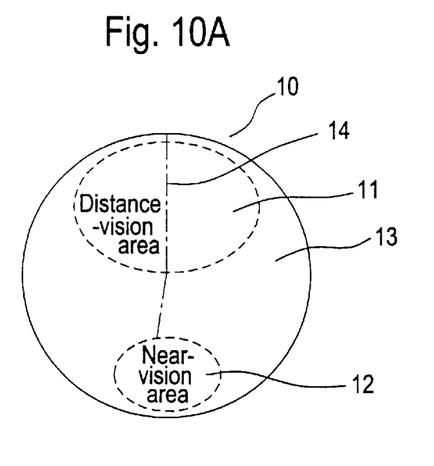
FIG. 10A is an elevational view showing the schematic structure.
Figure 10B:
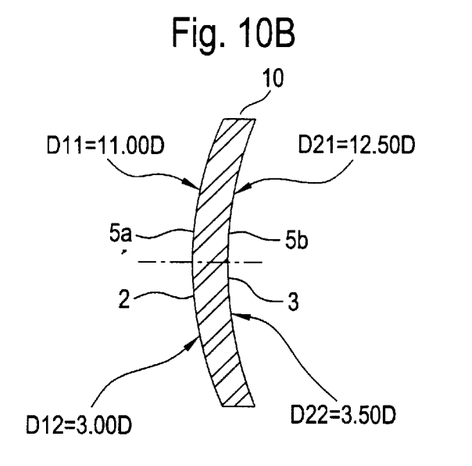
FIG. 10B is a cross-sectional view following the main line of sight.

In a multifocal lens in which the absolute value of the refractive power Po of the distance-vision area 11 is small, a multifocal lens can be provided, in which the distance-vision area 11 and the near-vision area 12 become magnification 1 of the naked eye, and have a shape that is comparatively easy to realize. The multifocal lens shown in FIGS. 10A and 10B is a progressive multifocal lens in which the refractive power Po of the distance-vision area 11 is −1.50D, the addition power Add is 1.00D, the average surface power D11 of the distance-vision area of the surface on the side of the object is 11.00D, and the average surface power D21 of the distance-vision area of the surface on the side of the eye is 12.50D. In this multifocal lens 10, the distance from the vertex L, the center thickness t, and the refractivity n are made the same as the conditions described above, and by making the average surface power D12 of the near-vision area of the surface on the side of the object 3.00D, and the average surface power D22 of the near-vision area of the surface on the side of the eye 3.50D, a multifocal lens can be realized, in which the magnification SM1 of the distance-vision area and the magnification SM2 of the near-vision area are 1.00, the same magnification as that of the naked eye. In a progressive multifocal lens, by connecting the distance-vision area and the near-vision area using a progressive area endowed with a progressive refractive surface so as to satisfy the average surface powers sought in this manner, a progressive multifocal lens can be provided, in which the change of the magnification is extremely small while the refractive power changes progressively.

The invention is explained above based on a progressive multifocal lens, but even in a bifocal lens not provided with a progressive area, an eyeglass lens can be provided, in which, in the same manner, the difference of magnification is minimal and jumping of images is minimal. Also, because the difference of the average surface powers on the side of the object can be less than that of a conventional lens, a bifocal lens can be provided, in which the boundary between far and near can be made gentle, and the boundary line does not stand out. Furthermore, eyeglass lenses were explained in the above examples, in which visual field areas for focusing on two types of distances are provided, being a distance-vision area and a near-vision area. However, it is obvious that the invention can be applied to a multifocal lens and eyeglass lens provided with a third, or more, visual field area having a different refractive power. Also, not being limited to the lenses described above, it is obvious that the elements of a toric surface for correcting astigmatism can be added to the surface on the side of the eye of a multifocal lens and eyeglass lens of the invention.

As explained above, in the invention, in a multifocal lens for eyeglass, the difference of the average surface power of the distance-vision area of the surface on the side of the object and the average surface power of the near-vision area, is made such that it is smaller than the addition power, which is different from the design policy of a conventional multifocal lens for eyeglass. Also, for the lens as a whole, from the average surface power of the distance-vision area of the surface on the side of the eye and the average surface power of the near-vision area, a multifocal lens for eyeglass can be provided, being endowed with a specific addition power. Thus, because optical properties for correction of vision other than astigmatism can be added to both surfaces, being the surface on the side of the object and the surface on the side of the eye, compared with a conventional multifocal lens for eyeglass in which the optical properties for correction of vision are added only to the surface on the side of the object, it is possible to improve further the astigmatic aberration by reducing the difference of the average surface powers on the side of the object. Also, it becomes possible to establish freely the average surface power of the surface on the side of the object, having a great influence on magnification, by combining it with the average surface power of the surface on the side of the eye. Also, it becomes possible to reduce the difference of magnification of the first and second visual field areas. As a result, it becomes possible, for example, to eliminate substantially the difference of magnification between the distance-vision area and the near-vision area, or to form a distance-vision area and a near-vision area having the same magnification as that of the naked eye. Also, even if the difference of magnification cannot be eliminated, according to the invention, it becomes possible to improve to a great extent the difference of magnification between the distance-vision area and the near-vision area over a conventional multifocal eyeglass lens.

Thus, according to the invention, it is possible to provide a multifocal lens for eyeglass, in which the difference of magnification can be reduced, and in addition, the properties of astigmatic aberration can also be improved. Consequently, by using a multifocal lens for eyeglass of the invention, an eyeglass lens can be provided, in which the user can obtain a comfortable visual field having a wider clear-vision area and having little jumping and warping.

The invention relates to a multifocal lens used as an eyeglass lens. According to the invention, it is possible to provide an eyeglass lens, in which the difference of magnification between the distance-vision area and the near-vision area is minimal, and there is minimal jumping and warping of images. Furthermore, an eyeglass lens can be provided, in which the properties of astigmatic aberration also can be improved.

What is claimed is:

1. A multifocal lens for eyeglass for viewing an object via an eye of a user, comprising:

a first visual field area having a refractive power; and a second visual field area having a refractive power which is different from the refractive power of the first visual field area, such that when a value attained by subtracting the refractive power from said first visual field area from the refractive power of said second visual field area is an addition power Add, an average surface power D11 of said first visual field area of a surface on a side of the object and an average surface power D12 of the second visual field area of the surface on the side of the object, and an average surface power D21 of said first visual field area of a surface on a side of the eye and an average surface power D22 of the second visual field area of the surface on the side of the eye, satisfy the following relationships, $$-(L \cdot n/t)\text{Add} < D12 - D11 < \text{Add} \qquad (A)$$

$$D21 - D22 = \text{Add} - (D12 - D11) \qquad (B)$$

wherein, L is a distance to the eye from the vertex of the surface of the lens on the side of the eye in units of meters (m), t is a center thickness of the multifocal lens for eyeglass in units of meters (m), and n is the refractivity of the multifocal lens for eyeglass.

2. The multifocal lens for eyeglass according to claim 1, wherein said average surface power D11 and said average surface power D12 satisfy the following relationship, $$0 < D12 - D11 < \text{Add}. \qquad (C).$$

3. The multifocal lens for eyeglass according to claim 1, wherein a difference DD1 of said average surface powers of the surface on the side of the object, which is attained by subtracting said average surface power D11 from said average surface power D12, is substantially equal to a difference DD2 of said average surface powers of the surface on the side of the eye, which is attained by subtracting said average surface power D22 from said average surface power D21.

4. The multifocal lens for eyeglass according to claim 1, wherein said average surface power D11 and said average surface power D12 satisfy the following relationship, $$D12 - D11 = 0. \qquad (D).$$

5. The multifocal lens for eyeglass according to claim 1, wherein said average surface power D11 and said average surface power D12 are selected such that the magnifications of said first and said second visual field areas become substantially equal.

6. The multifocal lens for eyeglass according to claim 1, wherein said average surface power D11 and said average surface power D12 are selected such that the magnifications of said first and said second visual field area approach 1.

7. The multifocal lens for eyeglass according to claim 1, wherein the multifocal lens possesses a progressive area in which the refractive power changes progressively between said first and said second visual field areas.

8. An eyeglass lens, comprising the multifocal lens for eyeglass as defined in claim 1 which is globe-processed to match the shape of an eyeglass frame.

* * * * *